United States Patent [19]
Defrancesco

[11] Patent Number: 4,829,775
[45] Date of Patent: May 16, 1989

[54] FILTERED ENVIRONMENTAL CONTROL SYSTEM

[75] Inventor: Gregory L. Defrancesco, Simsbury, Conn.

[73] Assignee: United Technologies Corporation, Hartford, Conn.

[21] Appl. No.: 189,252

[22] Filed: May 2, 1988

[51] Int. Cl.⁴ ............................................. F25D 17/06
[52] U.S. Cl. .......................................... 62/90; 62/402
[58] Field of Search ............................ 62/90, 401, 402

[56] References Cited

U.S. PATENT DOCUMENTS

| | | | |
|---|---|---|---|
| 2,969,920 | 1/1961 | Giannoni | 62/90 |
| 3,587,243 | 6/1971 | Keller et al. | 62/402 |
| 4,295,518 | 10/1981 | Rannenberg | 62/401 |
| 4,374,469 | 2/1983 | Rannenberg | 62/402 |
| 4,430,867 | 2/1984 | Warner | 62/402 |
| 4,434,624 | 3/1984 | Cronin et al. | 62/402 |
| 4,580,406 | 4/1986 | Nims | 62/402 |

*Primary Examiner*—Ronald C. Capossela
*Attorney, Agent, or Firm*—Lloyd D. Doigan

[57] ABSTRACT

An air-conditioning system being powered by a supply of compressed air, has an air cycle machine which incorporates a filter. The filter receives pressurized air for filtration after said air has passed through a heater which optimizes the temperature and humidity of the air and passes through a second reheater downstream of the filter and upstream of the turbine to maximize the efficiency of the turbine.

11 Claims, 1 Drawing Sheet

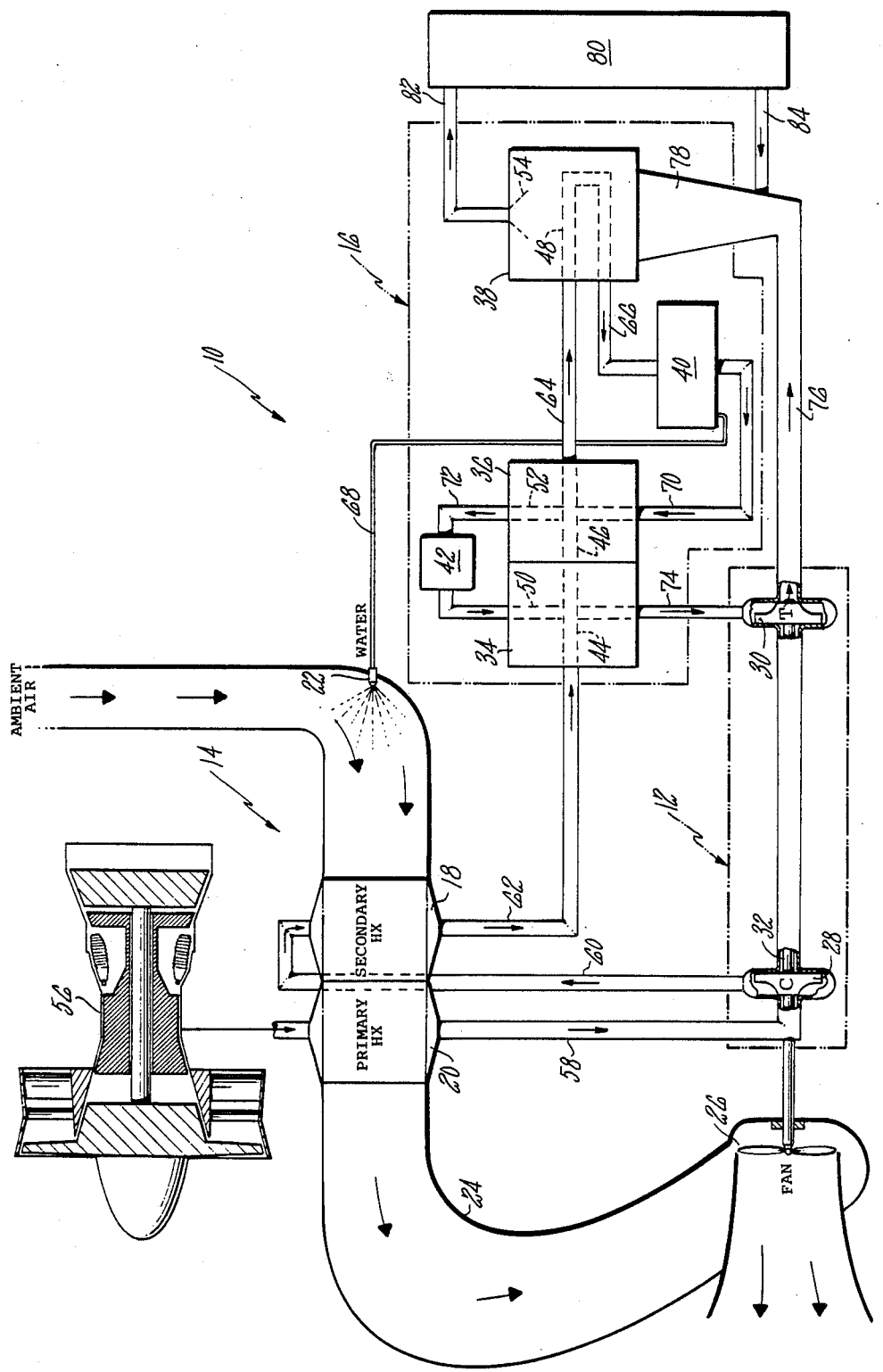

FILTERED ENVIRONMENTAL CONTROL SYSTEM

TECHNICAL FIELD

This invention relates to an air cycle environmental control system which integrates a filtration system therein.

BACKGROUND ART

An air cycle environmental control system (ECS) may be used to regulate the conditions of an enclosed environment such as an aircraft cabin. An air cycle ECS generally includes; a compressor for pressurizing air input thereto, and a turbine for driving the compressor and for expanding and cooling the air. The ECS may be powered by the air input thereto from a compressor section of an engine or from an auxiliary power unit (APU).

It is known to integrate an air filtration system or an air filter within an air cycle ECS to protect the inhabitants of the enclosed environment. Some filters and filtration systems, however have a limited life. A limited life may not be desirable when the inhabitants must be protected for longer periods of time.

DISCLOSURE OF THE INVENTION

It is an object of the invention to integrate a filtration system within an ECS to protect the inhabitants within a closed environment for extended periods of time.

It is a further object of the invention to optimize the performance of a filtration system that is integrated within an air cycle ECS.

It is a further object of the invention to optimize the performance of an air cycle ECS which integrates a limited-life filtration system.

According to the invention, an air cycle ECS is provided having; a first reheater arranged downstream of a compressor and upstream of a filter such that air flowing through the filter has the designed temperature and humidity for optimum filter life, and a second reheater placed downstream of the filter and upstream of the turbine such that the air flowing from the air filter to the turbine has sufficient energy to efficiently power the compressor. The heat energy provided by both the first and second reheater is supplied by air flowing from the compressor to the turbine.

These and other objects, features and advantages of the present invention will become more apparent in light of the following detailed description of a best mode embodiment thereof, as illustrated in the accompanying drawing.

BRIEF DESCRIPTION OF THE DRAWING

The FIGURE is a schematic diagram of an air cycle ECS which integrates a filter therein.

BEST MODE FOR CARRYING OUT THE INVENTION

Referring to the FIGURE, a filtered ECS 10 is shown. The system 10 has several portions including; an air cycle machine 12, a heat exchanger portion 14, and a filter portion 16.

The heat exchanger portion 14 includes; a secondary heat exchanger 18, a primary heat exchanger 20, a water injection nozzle 22, a conduit 24, and a fan 26. The fan is attached to the air cycle machine 12 as will be discussed infra.

The air cycle machine 12 is comprised of a coaxial compressor 28 and a turbine 30 connected by a shaft 32. The compressor pressurizes the air input to the system for use downstream thereof. The turbine extracts the heat energy of the air input thereto to drive the compressor 28 and fan 26 (via shaft 32) and to cool the air.

The filter section 16 is compressed of a first reheater 34, a second reheater 36, a condenser 38, a water collector 40, and a filter 42. As is well known in the art, the first reheater, the second reheater, and the condenser, each have a first passageway (or passageways, shown schematically at 42, 44, 46, respectively) for conducting a first fluid, such as air, and a second passageway (or passageways, shown schematically as 50, 52, 54, respectively) for conducting a second fluid, such as air. As is well known in the art, the first and second passageways passing through each of the reheaters and the condenser are arranged so that heat energy may be transferred between the fluids passing therethrough. In essence the reheaters and the condenser act as heat exchangers for the purposes described herein. The filter 42 may utilize charcoal to absorb nuclear and biological contamination. The optimal conditions of the air passing through such a filter, to ensure maximum filter life, are at about 60° F. and below about 80% relative humidity.

The system operates as follows. Compressed air, which is supplied by the compressor section of an engine 56 or APU (not shown), is directed through the primary heat exchanger 20 via line 58 to the compressor 28 of the air cycle machine 12. The compressor increases the pressure and temperature of the air input thereto as is well known in the art. The air passes from the compressor and passes to the secondary heat exchanger 18 via line 60. The air exits the secondary heat exchanger via line 62 at about 130° F. and then passes through the first passageway 44 of the first reheater 34 and the first passageway 46 of the second reheater 36. Line 64 carries the air from the second reheater to the first passageway 48 of the condenser 38. The first and second reheaters transfer some of the heat energy of the air passing through the first passageways as will be discussed infra. The air enters the first passageway of the condenser at about 90° F.

The temperature of the air entering the first passageway 48 of the condenser 38 is dropped to the air dew point to condense the water within the air into droplets. The droplets are carried with the air via line 66 to the water collector 40 where the droplets are removed as is well known in the art. The collected droplets are directed via line 68 to the nozzle 22 and the conduit 24 as will be discussed infra. The air exits the water collector 40 at close to 100% relative humidity and at about 50° F.

The air passes to the second passageway 52 of the reheater 36 via line 70 where heat energy passes from the air in the first passageway 46 to the air in the second passageway 52 thereby raising the temperature and lowering the relative humidity of the air passing through the second passageway to about 60° F. and 80% respectively. The air passes through the filter 42 via line 72 at optimum conditions for maximum filter life.

The air then passes to the second passageway 52 of the first reheater 34 and passes via line 74 to the turbine 30. Heat energy passes from the air passing through the first passageway 44 of the first reheater to the air passing through the second passageway 50 of the first reheater thereby raising the temperature of the air passing through the second passageway to about 90° F. so that there is sufficient energy within the air to provide power to the turbine and to maximize system performance.

The fan 26 is rotated by the turbine 30 to draw ambient air through the conduit 24. The ambient air passes through the primary heat exchanger 20 and the secondary heat exchanger 18 thereby cooling the air passing from the engine 56 and from the compressor 28 via line 58 and line 60 respectively. The collected droplets may be sprayed into the primary and secondary heat exchangers via nozzle 22 to provide evaporative cooling as is well known in the art.

The air, which exits the turbine 30 at about 0° F., is directed via line 76 to a mixer 78 and to the second passageway 54 of the condenser 38. The air is then directed to a closed environment 80, such as an aircraft cabin, via line 82. A certain amount of the air is returned from the closed environment via line 84 to the mixer 78 where it is added to the 0° F. turbine air to provide optimum conditions for the closed environment (about 40° F.). The mixed air in the second passageway 54 cools the air passing through first passageway 48 of the condenser to drop the temperature of that air to its dew point as discussed supra.

By placing a second reheater 36 upstream of the filter 42, air enters the filter at the design point in terms of temperature and humidity thereof. The filter life is thereby maximized and the filter need not be replaced as frequently as a system operating at less than optimum parameters. By placing the first reheater 34 downstream of the filter, the heat energy of the system 10 may be essentially stored for use by the turbine while allowing the condenser 38 and the filter to operate most efficiently. The first reheater passes the stored heat energy to the air passing to the turbine thereby optimizing turbine and system performance. As a result, the amount of air provided by the engine or APU, may be minimized, thereby increasing the efficiency of the entire system. The amount of cooling per pound of compressed air is greatly enhanced relative to other filtered ECSs.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

I claim:

1. A system for providing filtered, air-conditioned air to an environment, said system utilizing an air cycle machine for conditioning said air, said air cycle machine having a compressor and a turbine wherein air is pressurized by said compressor and communicated to said turbine where said turbine expands and cools said air and drives said compressor, said system characterized by:
    a filter for removing contaminants from said air, said filter being arranged downstream of said compressor and upstream of said turbine,
    a heat exchanger arranged downstream of compressor and upstream of said filter,
    a first reheater arranged downstream of said filter and upstream of said turbine, said first reheater having a first means for passing said air from said filter to said turbine and a second means for passing said air from said compressor to said turbine, said first and second means cooperating to transfer heat energy from the air passing through said first means to the air passing through said second means such that said air passing to said turbine from said filter helps maximize the performance of said turbine, and
    a second reheater arranged downstream of said compressor and upstream of said filter, said second reheater having a first means for passing said air from said compressor to said heat exchanger, and a second means for passing said air from said heat exchanger to said filter, said first and second means cooperating to transfer heat energy from the air passing through said first means to the air passing through said second means such that said air passing to said filter has a given temperature and humidity for providing optimal filter life.

2. A system for providing filtered, air-conditioned air to an environment, said system utilizing an air cycle machine for conditioning said air, said air cycle machine having a compressor and a turbine wherein air is pressurized by said compressor and communicated to said turbine where said turbine expands and cools said air and drives said compressor, said system characterized by:
    a filter for removing contaminants from said air, said filter being arranged downstream of said compressor and upstream of said turbine,
    means for conditioning said air arranged downstream of said compressor and upstream of said filter,
    a first reheater arranged downstream of said filter and upstream of said turbine, said first reheater having a first means for passing said air from said filter to said turbine and a second means for passing said air from said compressor to said turbine, said first and second means cooperating to transfer heat energy from the air passing through said first means to the air passing through said second means such that said air passing to said turbine from said filter helps maximize the performance of said turbine, and
    a second reheater arranged downstream of said compressor and upstream of said filter, said second reheater having a first means for passing said air from said compressor to said means for conditioning said air, and a second means for passing said air from said means for conditioning said air to said filter, said first and second means cooperating to transfer heat energy from the air passing through said first means to the air passing through said second means such that said air passing to said filter has a given temperature and humidity for providing optimal filter life.

3. The system of claim 2 wherein said means for conditioning said air is characterized by:
    means for removing water from said air.

4. The system of claim 3 wherein said means for removing water from said air comprises:
    a condenser and a water collector.

5. The system of claim 2 wherein said means for conditioning said air is characterized by:
    a first means for passing air received from said first means of said second reheater and for removing moisture from said air, and second means for passing said cool air from said turbine to said environment, said first and second means cooperating to transfer heat energy from said air passing through said first means to said air passing through said second means such that moisture is removed from said air passing to said filter.

6. A system for providing filtered, air-conditioned air to an environment, said system utilizing an air cycle machine for conditioning said air, said air cycle machine having a compressor and a turbine wherein air is pressurized by said compressor and communicated to said turbine where said turbine expands and cools said air and drives said compressor, said system characterized by:
- a filter for removing contaminants from said air, said filter being arranged downstream of said compressor and upstream of said turbine,
- a first reheater arranged downstream of said filter and upstream of said turbine, said first reheater adding heat energy to said air passing to said turbine to maximize the performance of said turbine, and
- a second reheater arranged downstream of said compressor and upstream of said filter, said second reheater adding heat energy to said air passing to said filter such that said air has a given temperature and humidity for providing optimal filter life.

7. The system of claim 6 further characterized by:
water means for removing a portion of moisture of said air, said water means being arranged downstream of said first and second reheaters and upstream of said filter.

8. The system of claim 7 wherein said water means is further characterized by:
means arranged downstream of said turbine for lowering the temperature of said water means such that said water means removes said portion of moisture of said air.

9. Method for conditioning air to be input to an environment by utilizing an air cycle machine having a compressor and a turbine to regulate a temperature of said air and a filter to remove contaminates from the air, said method comprising:
- transferring heat energy from said air passing from said compressor,
- passing said air from said compressor through a heat exchanger,
- transferring a portion of said heat energy into said air passing from said heat exchanger to provide said air with proper parameters for optimizing filter life,
- passing said air through said filter,
- transferring a portion of said heat energy into said air to provide said air passing from said filter with sufficient energy to power said turbine, and
- passing said air through said turbine.

10. Method for conditioning air to be input to an environment by utilizing an air cycle machine having a compressor and a turbine to regulate a temperature of said air and a filter to remove contaminates from the air, said method comprising:
- transferring heat energy from said air passing from said compressor,
- passing said air from said compressor through a means for removing moisture from said air,
- transferring a portion of said heat energy into said air passing from said means for removing moisture from said air to provide said air with proper parameters for optimizing filter life,
- passing said air through said filter,
- transferring a portion of said heat energy into said air passing from said filter to provide said air with sufficient energy to power said turbine, and
- passing said air through said turbine.

11. Method for conditioning air to be input to an environment by utilizing an air cycle machine having a compressor and a turbine to regulate a temperature of said air and a filter to remove contaminates from the air, said method comprising:
- transferring heat energy from said air,
- passing said air from said compressor through a means for removing moisture from said air,
- transferring a portion of said heat energy into said air passing from said means for removing moisture from said air to provide said air with proper parameters for optimizing filter life,
- passing said air through said filter,
- transferring a portion of said heat energy into said air passing from said filter to provide said air with sifficient energy to power said turbine, and
- passing said air through said turbine.

* * * * *